United States Patent

Tamura et al.

Patent Number: 6,137,555
Date of Patent: *Oct. 24, 2000

[54] LIQUID CRYSTAL PANEL WITH UNIFORM ADHESIVE LAYER AND METHOD OF MANUFACTURING

[75] Inventors: Hiroshi Tamura, Osaka; Masayoshi Ozaki, Hyogo; Shinichi Takigawa, Osaka, all of Japan

[73] Assignee: Matsushita Electronics Corporation, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/045,611

[22] Filed: Mar. 20, 1998

[30] Foreign Application Priority Data

Mar. 26, 1997 [JP] Japan .................................. 9-073113

[51] Int. Cl.[7] ...................... G02F 1/1335; G02F 1/1333; G02F 1/13
[52] U.S. Cl. .............................. 349/95; 349/158; 349/187
[58] Field of Search ............................. 349/95, 187, 158

[56] References Cited

U.S. PATENT DOCUMENTS

| 5,555,476 | 9/1996 | Suzuki et al. | 349/95 |
| 5,666,176 | 9/1997 | Kurematsu | 349/95 |
| 5,739,548 | 4/1998 | Shigeta et al. | 349/95 |
| 5,764,318 | 6/1998 | Kurematsu et al. | 349/95 |
| 5,929,962 | 7/1999 | Chiu et al. | 349/187 |

FOREIGN PATENT DOCUMENTS

| 0 409 619 | 1/1991 | European Pat. Off. . |
| 0 444 872 | 9/1991 | European Pat. Off. . |
| 0 658 779 | 6/1995 | European Pat. Off. . |
| 0 659 521 | 6/1995 | European Pat. Off. . |
| 0 867 745 | 9/1998 | European Pat. Off. . |
| 60-165621 | 8/1985 | Japan . |
| 60-165622 | 8/1985 | Japan . |
| 60-165623 | 8/1985 | Japan . |
| 60-165624 | 8/1985 | Japan . |
| 3-248125 | 11/1991 | Japan . |
| 4-174820 | 6/1992 | Japan . |
| 6-34966 | 2/1994 | Japan . |
| 7-28048 | 1/1995 | Japan . |
| 408250397A | 9/1996 | Japan . |
| 8-254641 | 10/1996 | Japan . |
| 8-327986 | 12/1996 | Japan . |
| 9-258195 | 10/1997 | Japan . |

*Primary Examiner*—William L. Sikes
*Assistant Examiner*—Tarifur R. Chowdhury
*Attorney, Agent, or Firm*—Merchant & Gould P.C.

[57] ABSTRACT

A predetermined amount of adhesive is dropped on microlenses formed on a first transparent substrate, a second transparent substrate is mounted thereon and one of the first and second transparent substrates is rotated to provide a thin and uniform adhesive layer. Later the adhesive is cured and integrated in a thin film transistor substrate, to which liquid crystal is filled to obtain a liquid crystal panel. The distance D between the microlenses and the second transparent substrate is: $0 < D \leq 1$ ($\mu$m), and the parallel precision between the first and second transparent substrates is no more than 1 $\mu$m. As the thickness of the adhesive layer can be thin and uniform, a liquid crystal panel having pixels with high numerical aperture and less display nonuniformity can be obtained.

3 Claims, 3 Drawing Sheets

LIQUID CRYSTAL PANEL WITH UNIFORM ADHESIVE LAYER AND METHOD OF MANUFACTURING

FIELD OF THE INVENTION

This invention relates to liquid crystal panels provided with microlenses used for improving the numerical aperture of the liquid crystal panels, and methods for manufacturing the same.

BACKGROUND OF THE INVENTION

Recently, the demand for liquid crystal panels has increased not only for direct-view liquid crystal panels but also for projection-type display devices such as a projection T.V. A liquid crystal panel is required to have sufficient brightness when it is used as a projection-type display device. In order to improve the brightness of a liquid crystal panel, the numerical aperture of the pixels should be improved. As a conventional method to improve the numerical aperture, providing microlenses to one of the substrates of a liquid crystal panel is well known, as disclosed in Publication of Japanese Patent Application (Tokkai Hei) No. 3-248125.

A conventional liquid crystal panel having microlenses is manufactured in the following steps.

First, on a first transparent substrate provided with fine microlenses, a second transparent substrate is adhered with an adhesive in order to form a lens substrate (hereinafter, a microlens array substrate). The second transparent substrate is a plate of glass, plastic and so on, and black matrices are provided as a shielding layer on this second transparent substrate. The ordinary thickness of the microlens array substrate is 1100 $\mu$m, or the thinnest one is 600 $\mu$m.

Next, a thin film transistor substrate provided with plural pixels and the microlens array substrate are adhered to each other at the peripheral regions with a seal adhesive while keeping a predetermined distance between these substrates, and liquid crystal is filled between them so that a liquid crystal panel is completed. Each microlens corresponds with each pixel provided for the thin film transistor substrate.

If a liquid crystal panel having no microlens is irradiated, the light is partially shielded by the black matrices. On the other hand, if a liquid crystal panel having microlenses to condense light is irradiated with light, the light that otherwise would be shielded by the black matrices is condensed at the apertures having no black matrices formed thereon. Therefore, a liquid crystal panel having microlenses can increase substantially the light condensing amount compared to the panel having no microlenses.

Actually, the light condensed by the microlenses is not condensed at one point on the pixel due to the angular dispersion of the light entering the liquid crystal panel, but it forms a light condensing spot having a certain range. So the condensing spot should be smaller than the pixel in order to condense light effectively by using the microlenses. A small condensing spot can be obtained by shortening the focal distance of the microlens. The condition to obtain the condensing effect is indicated by the following formula:

$$d=2f \tan \theta, d<1$$

As shown in FIG. 3, d is the diameter of a condensing spot, f is the focal distance of a microlens, $\theta$ is a dispersion angle of the light entering the liquid crystal panel, $l_1$ is the aperture size of a pixel l, and $l_2$ is the size of the shielding part of the pixel l.

As a recent projection-type display device is desired to have a high-definition liquid crystal panel, pixels as small as 15 $\mu$m are formed. The dispersion angle $\theta$ of the light entering the liquid crystal panel ranges from 5 to 10 degrees in general. Therefore, the focal distance f of the microlens should not exceed 43 $\mu$m, considering the above formula. Black matrices are provided at the focal points of the microlenses. Therefore, the total length consisting of the thickness of the second transparent substrate and the gap between the first and second transparent substrates (that is, the thickness of the adhesive layer) should not exceed 43 $\mu$m, namely, the focal distance f of the microlens.

In a general method to adhere microlenses on a transparent substrate, the microlenses are inserted between the parallel transparent substrates and adhered while being pressed. In this method, however, it is difficult to provide a thin adhesive layer and to make the gap between the two transparent substrates uniform as a whole. When the adhesive layer is thick, the gap between the transparent substrates tends to be further nonuniform. In a conventional method, the parallel precision between the transparent substrates is generally 3–4 $\mu$m. Moreover, even one foreign matter at least several $\mu$m thick between the transparent substrates will prevent the adhesive layer from having a uniform thickness. Therefore, extremely precise and clean equipment for adhesion is required.

In manufacturing a liquid crystal panel, when the thickness of an adhesive layer that adheres a first transparent substrate having microlenses and a second transparent substrate is nonuniform, the distance from the microlenses to the black matrices becomes nonuniform. And the light condensing amount of the microlenses will be nonuniform at the respective pixels, resulting in display nonuniformity. In addition, the surfaces of the transparent substrates will have waves because of the thickness nonuniformity of the adhesive layer. Therefore, the liquid crystal thickness will be nonuniform, and further display nonuniformity will occur. In order to prevent such display nonuniformity, nonuniformity in the thickness of the adhesive layer should be controlled to be about 1 $\mu$m.

SUMMARY OF THE INVENTION

An object of this invention is to provide a liquid crystal panel that has a high numerical aperture for each pixel and also less display nonuniformity, by providing an adhesive layer that is thin and more uniform in the thickness. Another object of this invention is to provide a method for manufacturing in a simple manner a liquid crystal panel having an adhesive layer that is thin and uniform in the thickness.

In order to achieve the above-mentioned objects, this invention has the following structure.

A liquid crystal panel of this invention comprises a lens substrate, a substrate having plural pixels arranged in opposition to the lens substrate, and a liquid crystal layer filled between the lens substrate and the substrate having plural pixels. The lens substrate comprises a first transparent substrate having a first surface provided with microlenses, a second transparent substrate having a second surface opposing to the first surface, and an adhesive layer adhering the first transparent substrate and the second transparent substrate. When the distance between the microlenses and the second surface is D($\mu$m), $0<D \leq 1$. According to this structure, a thinner adhesive layer can be formed, and thus, nonuniformity in the thickness of the adhesive layer can be decreased. As a result, waviness of the transparent substrates can be controlled and black matrices can be formed at the focal points of the microlenses more readily. Therefore, the light condensing effect of the microlenses becomes maximized and a liquid crystal panel with high numerical aperture can be provided. In addition, parallel precision between the first and second transparent substrates is improved since the nonuniformity of the adhesive layer can be decreased, plus the surface waviness of the transparent substrates can be reduced, so a liquid crystal panel having less display nonuniformity can be provided.

In the above structure, it is preferable that the distance $D(\mu m)$ between the microlenses and the second surface is $0<D\leq 0.5$. In this preferable structure, the thickness of the adhesive layer can be further reduced and the nonuniform thickness of the adhesive layer can be further decreased, so that the light condensing effect of the microlenses is improved more remarkably, and a liquid crystal panel with higher numerical aperture can be provided. At the same time, display nonuniformity due to the thickness nonuniformity of the adhesive layer can be further decreased.

It is preferable in the structure that the parallel precision between the first transparent substrate and the second transparent substrate is no more than 1 $\mu m$. In this preferable structure, a liquid crystal panel with less display nonuniformity can be provided. Here, the parallel precision between the first and second transparent substrates means the difference between the maximum value and minimum value of the gap between the first transparent substrate and the second transparent substrate.

A liquid crystal panel of this invention comprises a lens substrate, a substrate having plural pixels arranged in opposition to the lens substrate, and a liquid crystal layer filled between the lens substrate and the substrate having plural pixels. The lens substrate comprises a first transparent substrate having a first surface provided with microlenses, a second transparent substrate having a second surface opposing to the first surface, and an adhesive layer adhering the first transparent substrate and the second transparent substrate. The parallel precision between the first transparent substrate and the second transparent substrate is no more than 1 $\mu m$. Due to this structure, the light condensing amount at each pixel by the microlenses will be uniform, and the thickness of the liquid crystal can be also uniform as the surface waviness of the lens substrate will be reduced. As a result, a liquid crystal panel with less display nonuniformity can be provided.

A method for manufacturing a liquid crystal panel of this invention comprises the steps of:

providing an adhesive to the gap between a first transparent substrate having a first surface provided with microlenses and a second transparent substrate having a second surface and arranging the first and second transparent substrates so that the first surface and the second surface oppose each other;

rotating one of the first transparent substrate and the second transparent substrate in order to flatten the adhesive;

adhering the first transparent substrate and the second transparent substrate by curing the adhesive; and placing the second transparent substrate in opposition to a substrate having plural pixels, and filling liquid crystal between the second transparent substrate and the substrate having plural pixels.

Another method for manufacturing a liquid crystal panel of this invention comprises the steps of:

providing an adhesive to the gap between a first transparent substrate having a first surface provided with microlenses and a second transparent substrate having a second surface and arranging the first and second transparent substrates so that the first surface and the second surface oppose each other;

rotating one of the first transparent substrate and the second transparent substrate in order to flatten the adhesive;

adhering the first transparent substrate and the second transparent substrate by curing the adhesive; and placing the first transparent substrate in opposition to a substrate having plural pixels, and filling liquid crystal between the first transparent substrate and the substrate having plural pixels.

In every method mentioned above, the adhesive can be spread uniformly on the whole surface of the transparent substrates because of the centrifugal force by rotating either the first or second transparent substrate, so the thickness of the adhesive can be thin and uniform. In addition, any foreign matters between the two transparent substrates will be squeezed out with the adhesive to the periphery because of the rotation of the transparent substrate, and the foreign matters can be prevented from remaining between the transparent substrates. As a result, a liquid crystal panel having less foreign matters can be manufactured without using any specially precise and clean equipment for adhesion, and deterioration in the parallel precision of the transparent substrate, which is caused by the foreign matters, can be prevented. If the thickness of the adhesive layer is uniform for the above-mentioned reasons, the surfaces of the transparent substrates also will be uniform plates free from waviness. Furthermore, the flatness of the transparent substrates themselves is corrected due to the centrifugal force by rotating the transparent substrate, contributing to providing an adhesive layer that is uniform in the thickness and reducing the surface waviness of the transparent substrates.

In the above methods, it is also possible that another layer (e.g. a black matrix layer) is formed on either the first or second transparent substrate surface opposing to the substrate having plural pixels. In such a case, liquid crystal will be filled between the third layer (e.g. a black matrix layer) and the substrate having plural pixels.

It is preferable in the above-mentioned methods that either the first transparent substrate or the second transparent substrate first is rotated at an angular velocity ranging from 100 rpm to 1000 rpm and then either the first transparent substrate or the second transparent substrate is rotated at an angular velocity ranging from 1000 rpm to 10000 rpm, in the step of rotating one of the first and second transparent substrates in order to flatten the adhesive. In this preferable method, bubbles are exhausted by adhering well the adhesive layer and the two transparent substrates first at the low-speed rotation range and the thickness and the nonuniformity in the thickness of the adhesive layer can be adjusted at the subsequent high speed rotation range, so the liquid crystal panel of this invention can be provided readily.

DETAILED DESCRIPTION OF THE INVENTION

Figure 1:
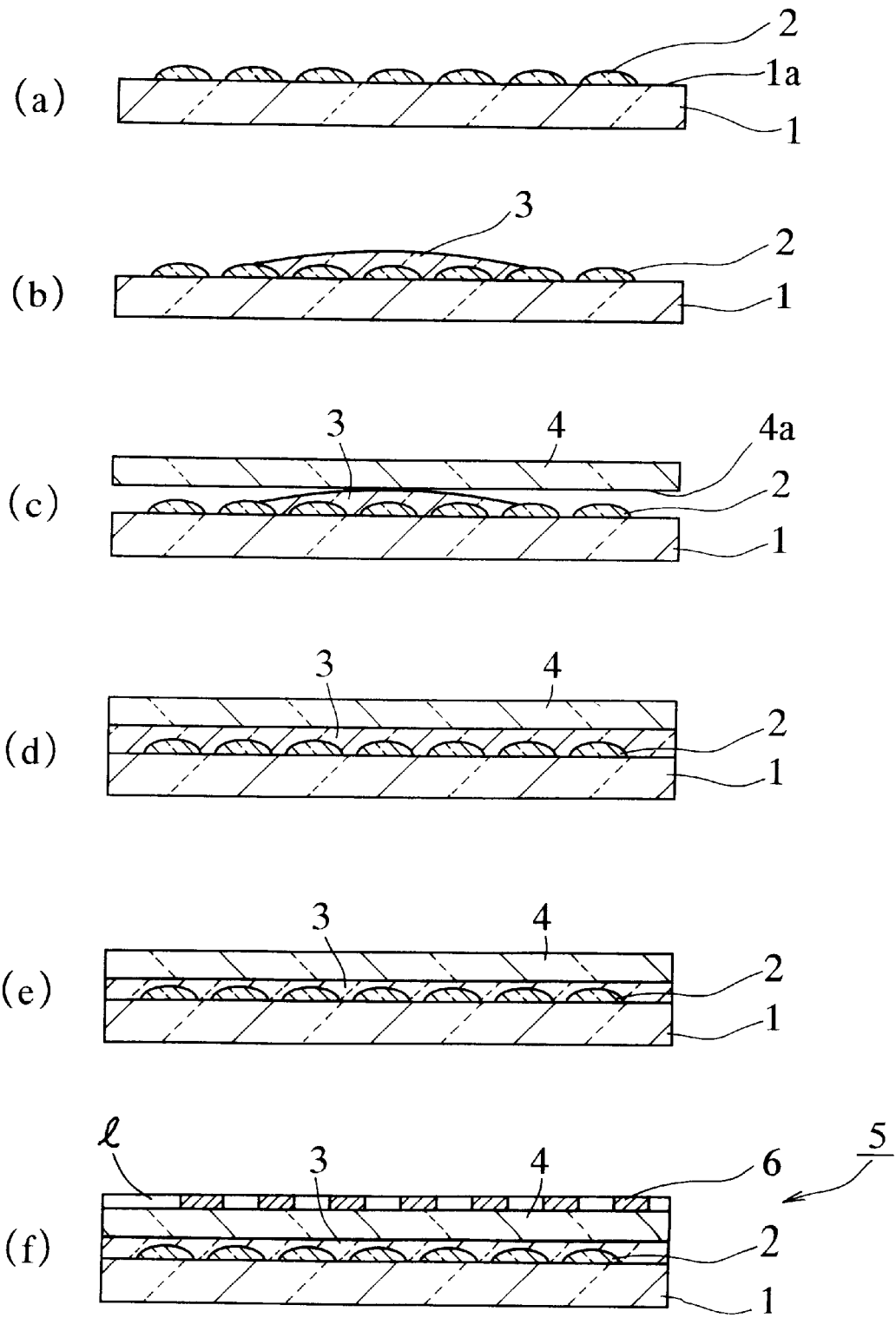
FIGS. 1(a)–1(f) are flow diagrams showing a method for manufacturing a liquid crystal panel in one embodiment of this invention.

The present invention will be explained in detail referring to FIGS. 1–3.

FIGS. 1(a)–1(f) are flow diagrams showing the steps of one embodiment for manufacturing a liquid crystal panel of this invention.

As shown in FIG. 1(a), fine microlenses 2 are formed on a first surface 1a of a first transparent substrate 1 comprising a plate of glass, plastic, etc. Acrylic resin, for example, can be used for the microlenses 2. In the next step, a predetermined amount of adhesive 3 is dropped on the microlenses 2 as shown in FIG. 1(b). Then, a second transparent substrate 4 is mounted on the adhesive 3 dropped on the microlenses 2, so that a second surface 4a of the second transparent substrate 4 opposes the first surface 1a of the first transparent substrate 1, as shown in FIG. 1(c). The second transparent substrate 4 comprises a plate of glass, plastic and so on. In the above-mentioned step, it is also possible that the adhesive is dropped on the second surface 4a of the second transparent substrate 4 instead of being dropped on the microlenses 2 on the first transparent substrate 1, and that the first transparent substrate 1 is mounted on the second transparent substrate 4, so that the first surface 1a will oppose the second surface 4a. Otherwise, the first transparent substrate 1 and the second transparent substrate 4 can be held to have a predetermined gap to let the first surface 1a oppose the second surface 4a in order to pour the adhesive 3 between the transparent substrates.

As shown in FIG. 1(d), the second transparent substrate 4 is rotated at a low speed of 100–1000 rpm. Next, as shown in FIG. 1(e), the second transparent substrate 4 is placed parallel to the first transparent substrate 1 with the adhesive of a predetermined thickness, by rotating the second transparent substrate 4 at a high speed of 1000–10000 rpm. The purpose of rotating the second transparent substrate 4 at a high speed after the rotation at a low speed is to prevent bubbles and foreign matters from remaining in the adhesive 3.

By rotating the second transparent substrate 4, the adhesive 3 is spread uniformly on the whole surface of the first transparent substrate 1 by the centrifugal force. Though the second transparent substrate 4 often has some warping or waviness of several dozens of $\mu$m before the adhesion step, the warping or waviness will be corrected by the centrifugal force. As a result, the adhesive 3 can be made thin and uniform, and the parallel precision between the two transparent substrates will have a uniformity of no more than 1 $\mu$m.

In the above steps, the first transparent substrate can be rotated in place of the second transparent substrate. Or, both the first and second transparent substrates can be rotated in the inverse or same direction in order to generate relative rotations. By rotating the transparent substrates together, the warping or waviness of the transparent substrates themselves can be corrected respectively by the centrifugal force.

In the subsequent step, the adhesive 3 is cured. The adhesive 3 used in this embodiment is transparent and its curing process can be controlled by light or heat. However, if the adhesive 3 is cured by heat, strains due to the heat will occur and the second transparent substrate 4 may warp. Therefore, it is preferable that an adhesive cured by light is used.

As shown in FIG. 1(f), black matrices 6 comprising chromium etc. are arranged on the second transparent substrate 4, so ascot to overlap with the focal points of the microlenses 2, and pixels 1 are formed from $In_2O_3 \cdot SnO_2$ (hereinafter, ITO), etc. As a result, a microlens array substrate 5 can be obtained. The black matrices 6 can be formed on the first transparent substrate 1, instead of being formed on the second transparent substrate 4 as shown in FIG. 1(f).

Figure 2:
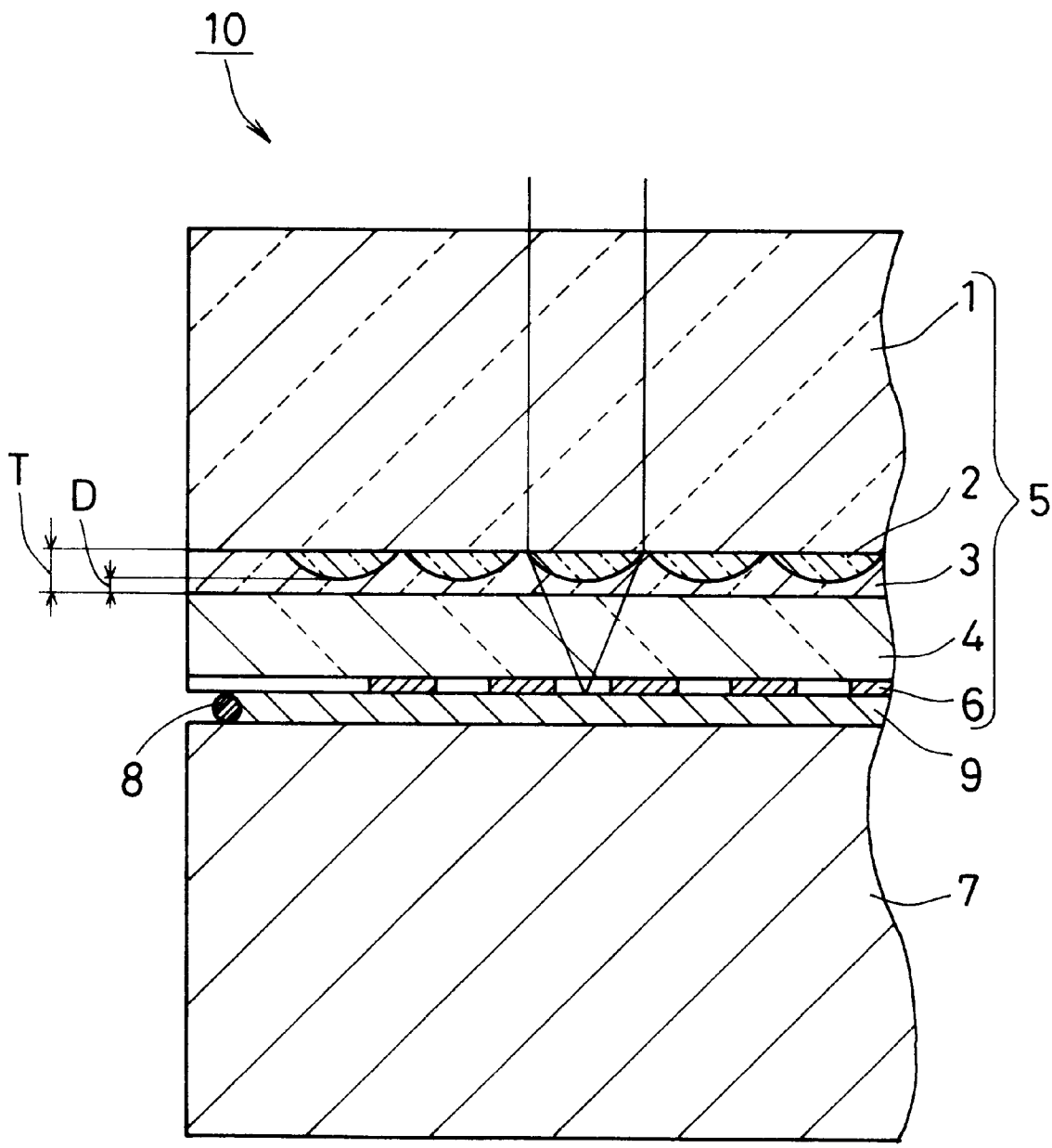
FIG. 2 is a partially magnified cross-sectional view of a liquid crystal panel in one embodiment of this invention.
Figure 3:
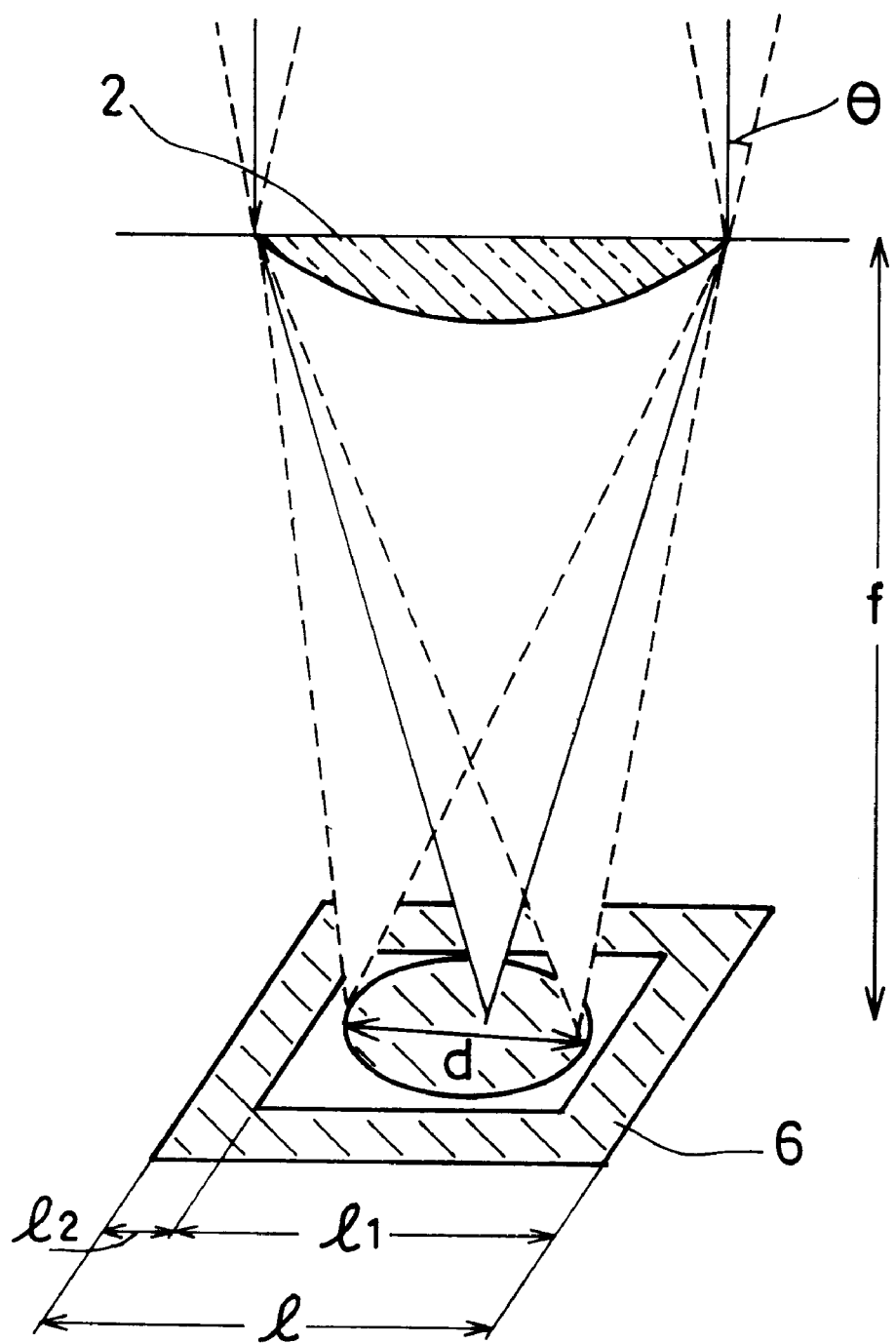
FIG. 3 is a schematic view specifying the light condensing effect by a microlens.

The following is an explanation about the method for manufacturing a liquid crystal panel by using the microlens array substrate 5 provided with the black matrices 6, referring to FIG. 2.

First, as shown in FIG. 2, a thin film transistor substrate 7 having plural pixels and the microlens array substrate 5 are faced to each other so that the microlenses 2 correspond to the respective pixels provided for the thin film transistor substrate 7. The thin film transistor substrate 7 and the microlens array substrate 5 are adhered to each other by a seal adhesive 8 comprising an epoxy resin etc. that is provided to either the periphery of the thin film transistor substrate 7 or of the microlens array substrate 5 while a predetermined distance is provided between the two substrates, and then, a liquid crystal panel 10 is completed by filling liquid crystal 9 between the substrates. A microlens array substrate comprising a first transparent substrate 1 having black matrices thereon will be adhered so that the black matrices 6 side will oppose the thin film transistor 7.

In the liquid crystal panel shown in FIG. 2, the distance D ($\mu$m) between the tips of the microlenses 2 and the second surface of the second transparent substrate 4 is: $0<D\leq 1$, or preferably, $0<D\leq 0.5$. As a result, a thinner adhesive layer is formed, nonuniformity in the adhesive layer thickness can be decreased relatively, and the black matrices are formed at the focal points of the microlenses in a simple manner. Therefore, the maximum light condensing effect of the microlenses is obtained and a liquid crystal panel having high numerical aperture can be provided. In addition, the thickness nonuniformity in the adhesive layer can be reduced relatively as the adhesive layer is thinner, so the parallel precision between the first and second transparent substrates is improved and the surface waviness of the transparent substrates can be reduced. As a result, a liquid crystal panel with less display nonuniformity can be provided.

In the liquid crystal panel of this invention, the parallel precision between the first transparent substrate and the second transparent substrate is 1 $\mu$m or less. Here, the parallel precision between the first and second transparent substrates means the difference between the maximum value and minimum value of the gap T between the first transparent substrate 1 and the second transparent substrate 4 in FIG. 2. When the parallel precision is 1 $\mu$m at most, the distance between the microlenses and the black matrices is settled, and the light condensing amount by the microlenses at respective pixels becomes uniform. In addition to that, the surface waviness on the microlens array substrate 5 is also reduced, so the thickness of the liquid crystal becomes uniform. As a result, a liquid crystal panel with less display nonuniformity can be provided.

This invention will be explained more specifically by referring to Examples 1 and 2.

EXAMPLE 1

A microlens array substrate was manufactured by the manufacturing method shown in FIG. 1. In Example 1, an ultraviolet curing acrylic resin was used for the adhesive. The second transparent substrate was rotated at a low speed of 200 rpm and then, at a high speed of 2000 rpm. After that, the adhesive was cured by using ultraviolet light. In the subsequent step, black matrices comprising chromium were arranged on the second transparent substrate, and pixels 1 of ITO were formed. In this way, a microlens array substrate was completed.

A microlens array substrate was obtained, whose distance D between the microlenses and the second surface of the second transparent substrate was 0.5 μm, and the parallel precision between the first and second transparent substrates was 0.5 μm. Substantially no waviness was seen on the black matrix surface.

Later, as shown in FIG. 2, the thin film transistor substrate and the microlens array substrate were opposed to each other to correspond the microlenses to the respective pixels provided on the thin film transistor substrate, and the two substrates were adhered while keeping a predetermined distance therebetween by using a seal adhesive comprising an epoxy resin, and liquid crystal was filled between the substrates in order to complete a liquid crystal panel.

The obtained liquid crystal panel had high numerical aperture on the whole display surface and the panel was free from display nonuniformity.

EXAMPLE 2

A liquid crystal panel was manufactured in the same way as Example 1, except that an epoxy resin (a thermosetting resin) was used as the adhesive. The second transparent substrate was rotated at a low speed of 800 rpm while kept at a room temperature before it was rotated at a high speed of 8000 rpm. The rotation number was increased compared to Example 1, since the viscosity of the epoxy resin was higher than that of the ultraviolet curing acrylic resin. Then, the second transparent substrate was heated to 180° C. to cure the adhesive, and thus, a microlens array substrate was completed.

In the microlens array substrate obtained in the above-mentioned method, the distance D between the microlenses and the second surface of the second transparent substrate was 1.0 μm, and the parallel precision between the first and second transparent substrates was 1.0 μm. Substantially no waviness was seen on the black matrix surface.

A liquid crystal panel was obtained in the same manner as Example 1. The obtained liquid crystal panel had high numerical aperture on the whole display surface and the panel was free from display nonuniformity.

Although in the above Examples thin film transistor substrates were used for the substrates having plural pixels, STN type liquid crystal panels having matrix-type layouts or MIM type liquid crystal panels show the similar effect.

In the above explanations, the microlens array substrate 5 having black matrices 6 shown in FIG. 2 was exemplified as the lens substrate, but the black matrices 6 are not a required element in this invention. Even if no black matrix is provided, the numerical aperture of each pixel is improved by using microlenses to condense light to each pixel of the thin film transistor substrate. As this invention provides the maximum and uniform light condensing amount from the microlenses to the respective pixels, this invention is applicable to such a liquid crystal panel in order to provide the similar effects.

Furthermore, the rotation speed of the transparent substrates is not limited to Examples, but it can be varied according to the viscosity of the adhesive 3. Namely, it is preferable that the substrates are rotated at a low speed at an angular velocity selected from 100–1000 rpm, and then, at a high speed at an angular velocity selected from 1000–10000 rpm.

The transparent substrate for rotation is not always limited to one of the substrates, but the transparent substrate for a low speed rotation and the transparent substrate for a high speed rotation can be changed. For instance, the second transparent substrate can be rotated at a high speed after the low speed rotation of the first transparent substrate; and the first transparent substrate can be rotated at a high speed after the low speed rotation of the second transparent substrate.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A method for manufacturing a liquid crystal panel comprising the steps of:

providing an adhesive to a gap between a first transparent substrate having a first surface provided with microlenses and a second transparent substrate having a second surface and arranging said first and second transparent substrates so that said first surface and said second surface oppose each other;

subsequently rotating at least one of said first transparent substrate and said second transparent substrate in order to flatten said adhesive and to improve parallel precision between said first transparent substrate and said second transparent substrate;

adhering said first transparent substrate and said second transparent substrate by curing said adhesive; and placing said second transparent substrate in opposition to a substrate having plural pixels, and filling liquid crystal between said second transparent substrate and said substrate having plural pixels.

2. The method for manufacturing a liquid crystal panel according to claim 1, wherein the step of providing said adhesive to the gap between said first transparent substrate having said first surface provided with microlenses and said second transparent substrate having said second surface and arranging said first and second transparent substrates so that said first surface and said second surface oppose each other comprises at least:

a step of dropping said adhesive on said microlenses; and a step of mounting said second transparent substrate on said adhesive so that said second surface opposes said first surface.

3. The method for manufacturing a liquid crystal panel according to claim 1, wherein one of said first transparent substrate and said second transparent substrate is rotated at an angular velocity ranging from 100 rpm to 1000 rpm and afterwards one of said first transparent substrate and said second transparent substrate is rotated at an angular velocity ranging from 1000 rpm to 10000 rpm in the step of flattening said adhesive by rotating one of said first transparent substrate and said second transparent substrate.

* * * * *